US008528366B2

(12) United States Patent
Berrada Sounni et al.

(10) Patent No.: US 8,528,366 B2
(45) Date of Patent: Sep. 10, 2013

(54) HEAT-REGULATING GLASS BENDING APPARATUS AND METHOD

(75) Inventors: Amine Berrada Sounni, Berkeley, CA (US); Ryan J. Linderman, Oakland, CA (US)

(73) Assignee: SunPower Corporation, San Jose, CA (US)

( * ) Notice: Subject to any disclaimer, the term of this patent is extended or adjusted under 35 U.S.C. 154(b) by 22 days.

(21) Appl. No.: 13/335,679

(22) Filed: Dec. 22, 2011

(65) Prior Publication Data

US 2013/0160495 A1 Jun. 27, 2013

(51) Int. Cl.
*C03B 23/025* (2006.01)
(52) U.S. Cl.
CPC .................. *C03B 23/0258* (2013.01)
USPC .............................. 65/288; 65/287
(58) Field of Classification Search
CPC .................................... C03B 23/0258
USPC .................... 65/107, 273, 287, 288
See application file for complete search history.

(56) References Cited

U.S. PATENT DOCUMENTS

| 4,153,474 A | 5/1979 | Rex |
| 4,323,719 A | 4/1982 | Green |
| 4,373,783 A | 2/1983 | Anderson |
| 4,456,332 A | 6/1984 | Anderson |
| 4,468,848 A | 9/1984 | Anderson et al. |
| 4,468,849 A | 9/1984 | Anderson et al. |
| 4,481,378 A | 11/1984 | Lesk |
| 4,502,200 A | 3/1985 | Anderson et al. |
| 4,640,734 A | 2/1987 | Roberts et al. |
| 4,643,543 A | 2/1987 | Mohn et al. |
| 4,643,544 A | 2/1987 | Loughran |
| 4,749,399 A | 6/1988 | Yamada et al. |
| 4,759,803 A | 7/1988 | Cohen |
| 4,865,638 A | 9/1989 | Kudo |

(Continued)

FOREIGN PATENT DOCUMENTS

| DE | 10041271 | 3/2002 |
| DE | 202004005198 | 8/2004 |

(Continued)

OTHER PUBLICATIONS

International Search Report and Written Opinion received in International Patent Application No. PCT/US2012/057854, dated Feb. 26, 2013, filed on Sep. 28, 2012; in 9 pages.

(Continued)

*Primary Examiner* — Christina Johnson
*Assistant Examiner* — Cynthia Szewczyk
(74) *Attorney, Agent, or Firm* — Knobbe Martens Olson & Bear LLP

(57) ABSTRACT

A sag-bending system is disclosed. The sag-bending system comprises a sag-bending glass support mold and a perimeter thermal manager. The support mold comprises a plurality of rib members extending in a first direction, each of the plurality of rib members having a curved upper surface shaped to form the collective upper surface having a position and shape to support a quadrilateral-shaped sag-bent glass sheet into a desired contour, each of the rib members further having a lower surface, and a plurality of support members extending in a second direction between at least two of the plurality of rib members, the second direction traverse to the first direction. The perimeter thermal manager is sized and positioned to surround, to extend at least partially over, and to extend at least partially under the periphery of the support mold.

19 Claims, 8 Drawing Sheets

(56) References Cited

U.S. PATENT DOCUMENTS

| | | | |
|---|---|---|---|
| 4,897,102 A | 1/1990 | Modesitt et al. |
| 5,180,441 A | 1/1993 | Cornwall et al. |
| 5,248,346 A | 9/1993 | Fraas et al. |
| 5,334,496 A | 8/1994 | Pond et al. |
| 5,344,496 A | 9/1994 | Stern et al. |
| 5,389,158 A | 2/1995 | Fraas et al. |
| 5,409,549 A | 4/1995 | Mori |
| 5,498,297 A | 3/1996 | O'Neill et al. |
| 5,580,395 A | 12/1996 | Yoshioka et al. |
| 5,616,185 A | 4/1997 | Kukulka |
| 5,660,644 A | 8/1997 | Clemens |
| 5,697,192 A | 12/1997 | Inoue |
| 5,865,905 A | 2/1999 | Clemens |
| 5,899,199 A | 5/1999 | Mills |
| 5,990,415 A | 11/1999 | Green et al. |
| 6,034,322 A | 3/2000 | Pollard |
| 6,131,565 A | 10/2000 | Mills |
| 6,323,478 B1 | 11/2001 | Fujisaki et al. |
| 6,359,209 B1 | 3/2002 | Glenn et al. |
| 6,442,937 B1 | 9/2002 | Stone |
| 6,553,729 B1 | 4/2003 | Nath et al. |
| 6,635,507 B1 | 10/2003 | Boutros et al. |
| 7,468,485 B1 | 12/2008 | Swanson |
| 7,554,031 B2 | 6/2009 | Swanson et al. |
| 7,709,730 B2 | 5/2010 | Johnson et al. |
| 7,820,906 B2 | 10/2010 | Johnson et al. |
| 7,825,327 B2 | 11/2010 | Johnson et al. |
| 7,932,461 B2 | 4/2011 | Johnson et al. |
| 7,953,557 B2 | 5/2011 | Johnson et al. |
| 7,968,791 B2 | 6/2011 | Do et al. |
| 8,039,777 B2 | 10/2011 | Lance et al. |
| 8,049,150 B2 | 11/2011 | Johnson et al. |
| 8,071,930 B2 | 12/2011 | Wylie et al. |
| 8,083,362 B2 | 12/2011 | Finot et al. |
| 2003/0106341 A1 | 6/2003 | Hanada et al. |
| 2004/0074490 A1 | 4/2004 | Mills et al. |
| 2007/0151598 A1 | 7/2007 | De Ceuster et al. |
| 2007/0257274 A1 | 11/2007 | Martter et al. |
| 2008/0035198 A1 | 2/2008 | Teppe et al. |
| 2009/0056699 A1 | 3/2009 | Mills et al. |
| 2009/0056785 A1 | 3/2009 | Johnson et al. |
| 2009/0056786 A1 | 3/2009 | Johnson et al. |
| 2009/0056787 A1 | 3/2009 | Johnson et al. |
| 2009/0095284 A1 | 4/2009 | Klotz |
| 2009/0139557 A1 | 6/2009 | Rose et al. |
| 2010/0154788 A1 | 6/2010 | Wells et al. |
| 2010/0163014 A1 | 7/2010 | Johnson et al. |
| 2010/0175740 A1 | 7/2010 | Johnson et al. |
| 2010/0193014 A1 | 8/2010 | Johnson et al. |
| 2010/0236626 A1 | 9/2010 | Finot et al. |
| 2010/0294336 A1 | 11/2010 | Johnson et al. |
| 2010/0319682 A1 | 12/2010 | Klotz |
| 2011/0023940 A1 | 2/2011 | Do et al. |
| 2011/0132457 A1 | 6/2011 | Finot |
| 2011/0186130 A1 | 8/2011 | Finot et al. |
| 2011/0226309 A1 | 9/2011 | Do et al. |
| 2011/0226310 A1 | 9/2011 | Johnson et al. |
| 2011/0265869 A1 | 11/2011 | Finot et al. |

FOREIGN PATENT DOCUMENTS

| | | |
|---|---|---|
| GB | 2340993 | 3/2000 |
| JP | 06-219759 | 8/1994 |
| JP | 2007184542 | 7/2007 |
| JP | 2007194521 | 8/2007 |
| JP | 2007214247 | 8/2007 |
| KR | 1020070070183 | 7/2007 |
| KR | 1020090014153 | 2/2009 |
| WO | WO9957493 | 11/1999 |
| WO | WO2007096157 | 8/2007 |
| WO | WO2007096158 | 8/2007 |
| WO | WO2008022409 | 2/2008 |
| WO | WO2008153922 | 12/2008 |
| WO | WO2009023063 | 2/2009 |
| WO | WO2009029275 | 3/2009 |
| WO | WO2009029277 | 3/2009 |

OTHER PUBLICATIONS

Bardwell, Karen et al., "Minimizing End Shadowing Effects on Parabolic Concentrator Arrays," IEEE, 1980, pp. 765-770.

Carroll, Don et al. "Production of the Alpha Solarco Proof-of-Concept Array," IEEE, 1990, pp. 1136-1141.

Edenburn, Michael W., et al. "Shading Analysis of a Photovoltaic Cell String Illuminated by a Parabolic Trough Concentrator," IEEE, 1981, pp. 63-68.

Quagan, Robert J., "Laser Diode Heat Spreaders," Ion Beam Milling, Inc., website copyright 2010, http://www.ionbeammilling.com/default.asp, 9 pgs.

Shepard, Jr., N. F. et al., "The Integration of Bypass Diodes with Terrestrial Photovoltaic Modules and Arrays," IEEE, 1984, pp. 676-681.

Stern, T. G., "Interim results of the SLATS concentrator experiment on LIPS-II (space vehicle power plants)," Photovoltaic Specialists Conference, 1988., Conference Record of the Twentieth IEEE , vol., no., pp. 837-840 vol. 2, 1988. URL: http:ieeexplore.ieee.org/stamp/stamp.jsp?tp=&arnumber=105822&isnumber=3239.

Vivar Garcia, Marta, "Optimisation of the Euclides Photovoltaic Concentrator," 2009, 390 pages.

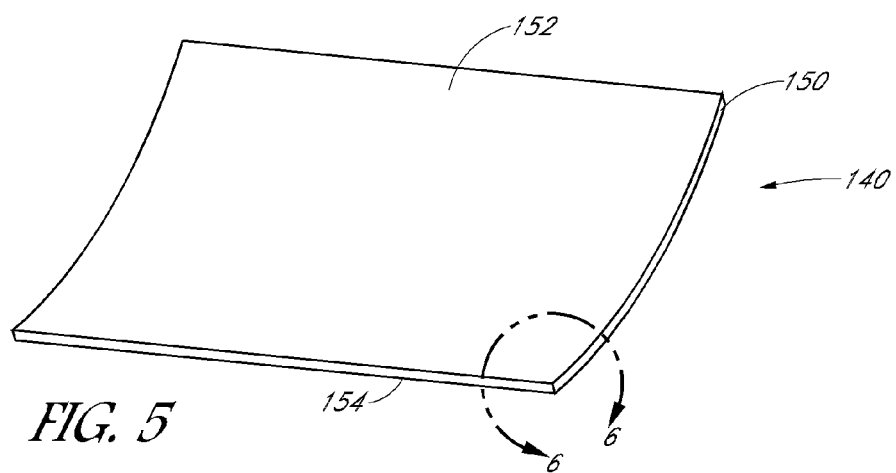
*FIG. 5*
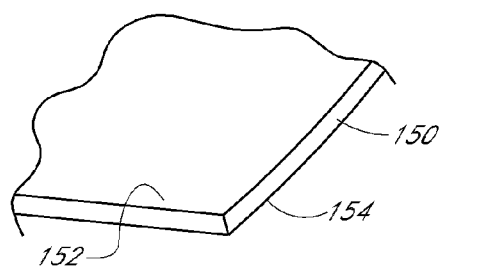
*FIG. 6*
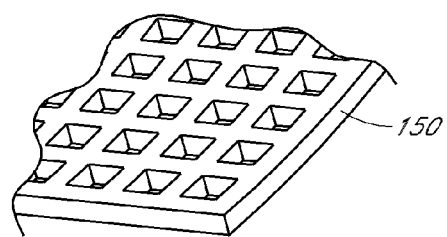
*FIG. 7*
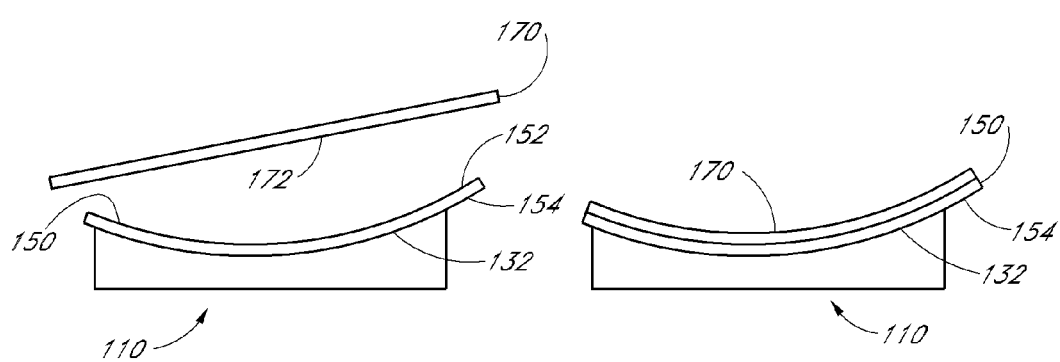
*FIG. 8*
*FIG. 9*

HEAT-REGULATING GLASS BENDING APPARATUS AND METHOD

TECHNICAL FIELD

Embodiments of the subject matter described herein relate generally to bending rigid sheets of glass into curved shapes. More particularly, embodiments of the subject matter relate to adjusting the temperature while sag-bending glass sheets.

BACKGROUND

Shaped glass mirrors can be used in solar concentrating applications, including concentrated photovoltaic (CPV) systems. CPV systems can be designed to use mirrors having any of a variety of shapes, including parabolic-shaped mirrors. CPV systems include a solar receiver upon which concentrated sunlight is directed. Some CPV systems can use a partial parabolic shaped mirror, which is define as a mirror having a curved surface that corresponds to an arc along a parabola. Such an arc need not include the vertex of the parabola.

CPV mirrors have extremely high precision requirements because small deviations from the designed sunlight concentration profile and the desired location of the profile on the solar receiver have a strong negative impact on the power generation of the overall CPV system. Accordingly, the glass mirror bending process should be as free from defect, imperfection, and deformation as possible. Current mirror bending technology relies on sag bending, where a flat glass sheet is heated in a furnace above a rib-based mirror mold. The glass sheet sags when heated under its own weight. The rib-based mold then supports the flexible glass sheet, causing the glass sheet to assume the curved shape of the mold, thereby producing a curved sheet of glass for a mirror.

The rib-based mold is typically constructed of a steel or other similar metal. Such molds, however, produce a mirror with imperfections. Because the glass sheet is a continuous surface and the rib-based mold contacts and supports only portions of the surface, while the remainder of the surface is exposed to the furnace environment, the glass sheet experiences dissimilar rates of thermal expansion and heat transfer between the portions of the sheet contacting the mold and the portions unsupported by the ribs. This arrangement can produce imperfections in the glass sheet. These imperfections later negatively impact the performance of the CPV system.

Additionally, as with any other sheet of material, a sag-bent sheet of glass left to harden in a relatively cooler ambient environment will cool faster at the edges than in the center. This disparity in cooling rates can cause distortions or imperfections in the desired curve shape. Some efforts to mitigate these imperfections in curvature have been proposed, including the use of counterweighting of the edges to induce additional sag, or purposefully-countershaped glass sheets designed to match the curvature of the rest of the glass sheet once sag-bent. Both efforts are imperfect and often function by approximation of the anticipated edge effects, which can be specific to the actual processing conditions and vary between installations or even batches in the same oven. Nonetheless, the impairments in the glass sheet still result in reduced reflection accuracy and reduce the power of a CPV system.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 5 is a perspective view of an embodiment of a sheet portion of a sag mold;

FIG. 6 is a detailed view of a corner of the sheet portion embodiment of FIG. 5;

FIG. 7 is a detailed view of a corner of an alternative embodiment of a sheet portion;

FIG. 8 is an end view of an embodiment of an improved sag mold with an adjacent glass sheet;

FIG. 9 is an end view of the embodiment of the sag mold of FIG. 8 with a sag-bent glass sheet in contact with the sheet portion of the sag mold;

DETAILED DESCRIPTION

Figure 1:
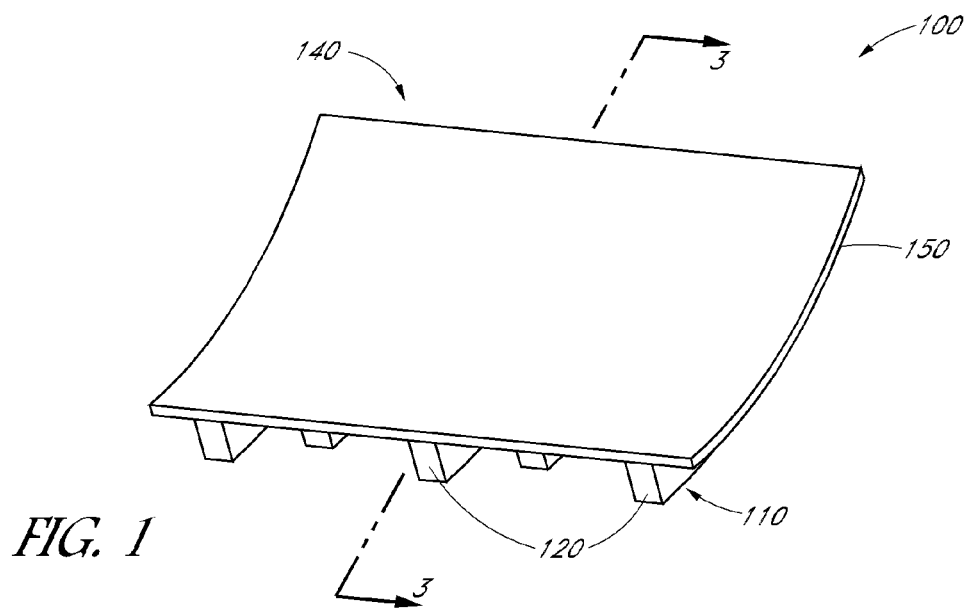
FIG. 1 is a perspective view of an embodiment of an improved sag mold.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/ node/feature, and not necessarily mechanically. Thus, although the schematics shown in the figures depict exemplary arrangements of elements, additional intervening elements, devices, features, or components may be present in an embodiment of the depicted subject matter.

"Adjust"—Some elements, components, and/or features are described as being adjustable or adjusted. As used herein, unless expressly stated otherwise, "adjust" means to position, modify, alter, or dispose an element or component or portion thereof as suitable to the circumstance and embodiment. In certain cases, the element or component, or portion thereof, can remain in an unchanged position, state, and/or condition as a result of adjustment, if appropriate or desirable for the embodiment under the circumstances. In some cases, the element or component can be altered, changed, or modified to a new position, state, and/or condition as a result of adjustment, if appropriate or desired.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

Two types of improvements can be made to the current technology to improve the performance of, and correspondingly reduce the imperfection formation in, sag-bending molds. In the first class of improvement, an insert can be introduced between the mold and the glass sheet to create a more thermally stable surface onto which the glass sheet can sag when heated. In the second class of improvement, the upper surfaces of the ribs comprising the mold can be coated or otherwise topped with a mediating material to provide a superior thermal interface between the glass sheet and metal ribs forming the mold. The glass produced by sag bending can be silvered or otherwise metallized to produce a mirror suitable for use in CPV applications.

A sag-bending glass sheet mold is disclosed. The sheet mold comprises a plurality of lateral support members, a plurality of longitudinal support members arranged perpendicular to the lateral support members, each of the plurality of lateral support members extending between two of the plurality of longitudinal support members, each of the plurality of longitudinal support members having an upper surface, and the upper surfaces of each of the plurality of longitudinal support members combined to form a mold support surface. The sheet mold can also comprise a glass-bearing support sheet disposed atop the mold support surface, the glass-bearing support sheet extending across the plurality of longitudinal support members and above the lateral support members, the glass-bearing support sheet having a curved upper surface.

Another embodiment of a sag-bending glass mold is disclosed. The glass mold comprises (i) a rectangular perimeter comprising (a) first and second longitudinal members extending in a first direction and first and (b) second lateral members extending in a second direction, the first and second directions substantially perpendicular to each other, each of the first and second longitudinal members coupled to each of the first and second lateral members, a plurality of lateral ribs extending substantially parallel to the second direction, a first of the plurality of lateral ribs coupled to the first longitudinal member and a second of the plurality of lateral ribs coupled to the second lateral member, (ii) a plurality of longitudinal ribs extending substantially parallel to the first direction, a first of the plurality of longitudinal ribs coupled to the first lateral member and a second of the plurality of longitudinal ribs coupled to the second lateral member, each of the plurality of longitudinal ribs coupled to at least one of the plurality of lateral ribs, and (iii) a ceramic sheet above the plurality of lateral ribs and plurality of longitudinal ribs, the ceramic sheet extending across each of the plurality of lateral ribs and across each of the plurality of longitudinal ribs, the ceramic sheet further extending across at least part of each of the first and second longitudinal members and each of the first and second lateral members, the ceramic sheet having a curved upper surface, wherein the ceramic sheet has a coefficient of thermal conduction of at most 100 W/(m·K) and a coefficient of volumetric thermal expansion of at most $10 \times (10^{-6}/K)$.

A method of bending a sheet of glass is also disclosed. The method comprises positioning a substantially flat sheet of glass above a sag-bending mold having a ceramic surface forming an upper surface of the sag-bending mold, increasing the flexibility of the sheet of glass by increasing the temperature of the sheet of glass above a first predetermined temperature, and altering the shape of the sheet of glass to a curved shape by supporting the heated sheet of glass with the ceramic surface.

FIG. 1 illustrates a first embodiment of an improved sag mold 100. The mold 100 comprises a rib portion 110 and a sheet portion 140. The rib portion 110 can be positioned beneath and supporting the sheet portion 140. The rib portion 110 can comprise several longitudinal members 120 and several lateral members 130. The sheet portion 140 can comprise the support sheet 150 positioned above the rib portion 110. The support sheet 150 can support a sheet of glass to sag bend it into a desired curved shape.

Figure 2:
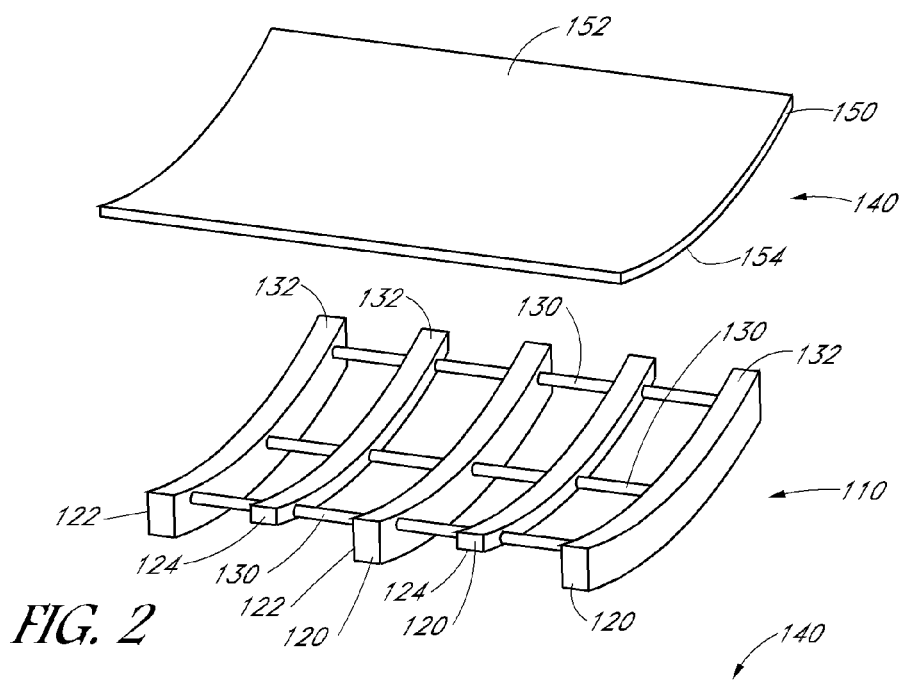
FIG. 2 is an exploded view of the embodiment of the sag mold of FIG. 1.

The rib portion 110 can be seen more clearly in the exploded view of FIG. 2, to which additional reference is made. The longitudinal members 120 can extend substantially the same length though, as can be seen, can have different cross-sectional geometries. For example, the thick longitudinal member 122 can be taller, having a larger height, than the thin longitudinal member 124. Regardless of cross-sectional shape, height, spacing between longitudinal members 120, and other properties of the arrangement of the rib portion 110, the longitudinal members 120 can define an upper surface 132. Although a certain number of longitudinal members 120 of any geometry are shown, more or fewer can be present in any embodiment, from as few as one to as many as desired for any embodiment. When one longitudinal member 120 is present, the lateral members 130 can contribute to the definition of the curved shape of the upper surface 132. Additionally, in those embodiments where the lateral and longitudinal members 130, 120 are reversed, the properties described for any one can be present in the other.

Thus, the terms "longitudinal" and "lateral" are used for reference to the illustrated embodiment and are not intended to limit the types or direction of the members. In other embodiments, the longitudinal and lateral directions may be reversed, but the terms can still be used to refer to support members extending substantially or approximately in perpendicular directions for the purpose of creating the structure of the rib portion 110. The longitudinal and lateral members 120, 130 can have freedom to thermally expand without deforming the shape of the rib portion 100. For example, they can be interconnected using pin-joints or articulated couplings which permit free thermal expansion without deforming the members 120, 130. In some embodiments, gaps or openings can be present to provide space for expansion free from force-transmitting contact with another component.

The upper surface 132 can have a curved shape, including a parabolic or partial parabolic shape, as well as other desired shapes. The upper surface 132 can be formed in a non-parabolic shape as well, including the linear-square composite shape as described in U.S. patent application Ser. No. 13/324,992 ("GLASS BENDING METHOD AND APPARATUS"), filed on Dec. 13, 2011, the entirety of which is explicitly incorporated herein by reference. Accordingly, the upper surface 132, support sheet upper surface 152, sag mold 100, and all other embodiments described herein can be used to produce the shapes described in said application.

Figure 3:
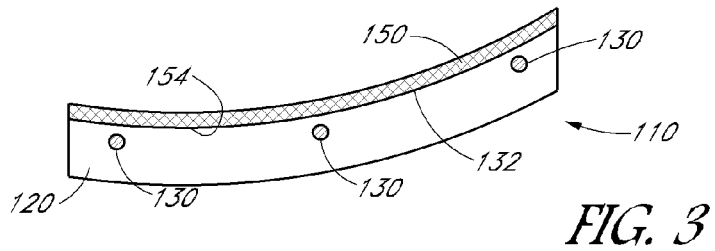
FIG. 3 is a cross-sectional end view of the embodiment of the sag mold of FIG. 1.

Additional reference to FIG. 3 illustrates a cross-sectional view of the sag mold 100 showing a side or end view of the mold 100. The visible longitudinal member 120 is a thick longitudinal member 122 with upper surface 132 having the illustrated curved shape which increases in height from left to right in FIG. 3. Other longitudinal members 120, thick and thin 122, 124, if shown, would have an upper surface 132 in line with the upper surface 132 of the illustrated longitudinal member shown, though these are omitted for clarity. The upper surface 132 can be distributed across and formed, described, and defined by all or most of the longitudinal members 120. Accordingly, the upper surface 132 can be distributed across the entirety or substantially the entirety of the rib portion 110, which can define the upper surface 132.

Figure 4:
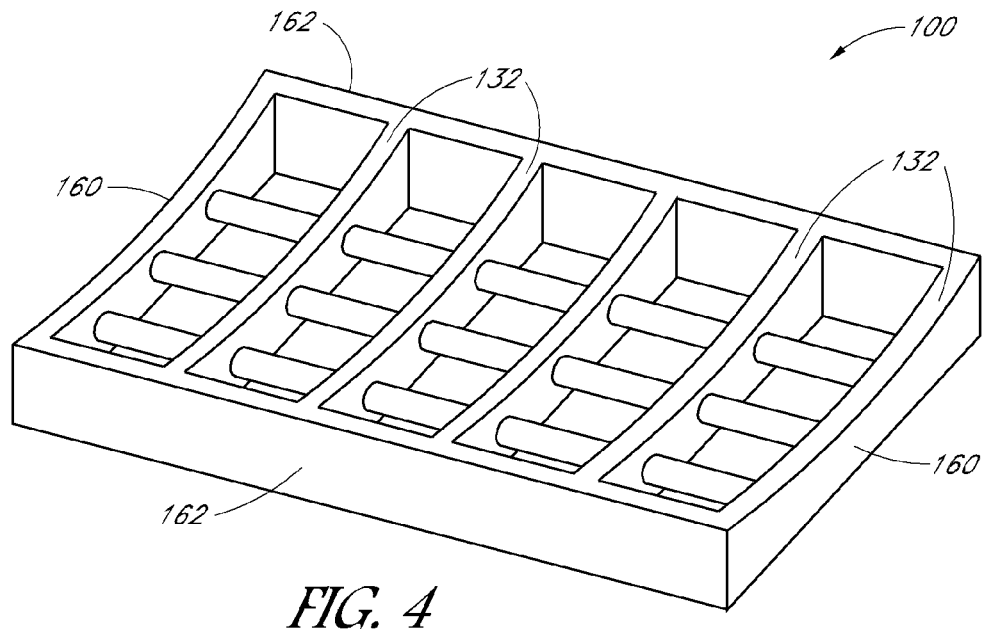
FIG. 4 is a perspective view of an alternative embodiment of a rib portion of a sag mold.

FIG. 4 illustrates an alternative embodiment of a sag mold 100, wherein a perimeter comprised of longitudinal perimeter members 160 and lateral perimeter members 162 form a substantially rectangular shape around the rib portion 110. In the illustrated embodiment, both perimeter members 160, 162 have a height forming part of the curved surface 132. In other embodiments, the longitudinal perimeter members 160, lateral perimeter members 162, or both can have a geometry which places the upper portion of any of them below the upper surface 132, and the remainder of the rib portion 110 contributes to form the upper surface 132.

With reference again to FIGS. 1-3, the lateral members 130 can couple with, couple to, extend through, or connect the various longitudinal members 120. Each illustrated lateral member 130, therefore, can be a single piece which extends the lateral width of the sag mold 100, passing through the interposed longitudinal members 120. In other embodiments, each illustrated, or any present, lateral member 130 is a discrete piece which is coupled to, such as by welding, brazing, or fastening, the longitudinal members 120 it supports. Although three lateral members 130 are shown, more or fewer can be present in any embodiment of the rib portion 110, as desired. Additionally, although the lateral members 130 are not shown forming a part of the upper surface 132, in certain embodiments, the upper surfaces of the lateral members 130 can contributed to the formation of the upper surface 132.

Additional reference is made to FIGS. 5-7 in describing the support sheet 150. The support sheet 150 can rest on the rib portion 110, either without constraint or coupled by a mechanism such as a clip, fastener, interference fit, or other desired technique, including a releasable or detachable system. The support sheet 150 can be sized to fit exactly or nearly exactly on the upper surface 132, overlaying the rib portion 110. In some embodiments, the support sheet 150 can extend beyond the upper surface 132, and therefore its upper surface 152 can have a curved shape extending beyond the portion of the curve used to support a glass sheet during sag bending.

The support sheet 150 can have an upper surface 152 and a lower surface 154. In certain embodiments, the support sheet 150 can be composed of ceramic or another composite, or any other material which embodies the desired characteristics. The support sheet 150 can have a thickness of as few as 0.01 millimeters (mm) or as thick as 3 m. The term "thickness" can also refer to support sheets which comprise vertical legs or standoffs, and when applied to such embodiments, can measure the overall height of the sheet portion in a vertical direction. In such embodiments, the sheet portion can be fairly described using other terms as well, and need not be a thin sheet, as illustrated here.

The support sheet 150 can be flat, such as having a smooth surface with a surface flatness varying by no more than 50 micrometers from the curved surface of the support sheet 150. The support sheet 150 can be thermally stable, having a coefficient of thermal expansion of at most $15 \times (10^{-6}/K)$. Similarly, some embodiments of the support sheet 150 can have a coefficient of thermal conduction of at most 100 W/m·K. In some embodiments, the support sheet 150 can be a ceramic sheet with a thickness of 10 mm, a coefficient of thermal expansion of $5.1 \times (10^{-6}/K)$, and a coefficient of thermal conduction of 3 W/m·K. For example, Alumina 60% can be used in one embodiment.

FIG. 5 illustrates the support sheet 150 in isolation for clarity. In certain embodiments, the support sheet 150 can be a solid sheet, as shown in FIG. 6, which is a detailed view of the corner of support sheet 150. As shown in FIG. 7, in another embodiment, the support sheet 150 can be a mesh or of porous construction. The pitch or size of openings through the support sheet 150 can vary based on the embodiment to any desired value or measure. In certain embodiments, the openings need not extend entirely through the support sheet 150, and can instead be depressions in the upper surface 152.

In some embodiments, the support sheet 150 can be a solid component, while in other embodiments, the support sheet 150 can be of multi-layer construction. In one exemplary embodiment, the support sheet 150 can be a ceramic sheet with a friction-reducing or adhesion-reducing upper layer, such as a fluoropolymer, while in other embodiments, the upper layer can be omitted. One example adhesion-reducing layer can be a synthetic fluoropolymer of tetrafluoroethylene, such as the product markted by E.I. du Pont de Nemours and Company ("DuPont") as TEFLON™. In some embodiments, the adhesion-reducing layer can be a consumable, such as a mineral powder or other solid powder. In certain embodiments, the powder, grain, or solid lubricant can have a sintering temperature below the temperature at which glass is sag-bent during the process incorporating the mold 100.

The lower surface 154 can conform to the upper surface 132 of the rib portion 110. Accordingly, the support sheet 150 can be positioned easily on the rib portion 110 on the mating surfaces. The upper surface 152 can support a glass sheet during a sag-bending process, forming the curved shape of the finished bent glass sheet. The support sheet 150 can have a partial parabolic, parabolic, linear, or any other desired curved upper surface 152 which comports to the shape desired for the glass sheet which is to be sag-bent.

FIG. 8 illustrates an arrangement of the sag mold 100 adjacent a flat glass sheet 170. The flat glass sheet 170 has a lower surface 172. When positioned above the sag mold 100 and heated to a first predetermined temperature, the glass sheet 170 can sag to conform to the shape of the upper surface 152 of the support sheet 150, as shown in FIG. 9. Thus, the glass sheet 170 can be formed into a glass sheet having a desired curve shape. Although a glass sheet is described herein, any other material suitable for sag bending can be similarly used. For example, certain polymers can also benefit from the process and advances described herein.

The continuous surface proffered by the support sheet 150 is superior to older sag molds for evenly distributing heat to the glass sheet, minimizing localized deformations caused in the glass sheet being shaped due to either sagging between rib members or heat transfer differential between portions of the glass sheet contacting the metal rib members and those portions exposed to the environment between rib members or discrepancies between ribs due to manufacturing defects.

Figure 10:
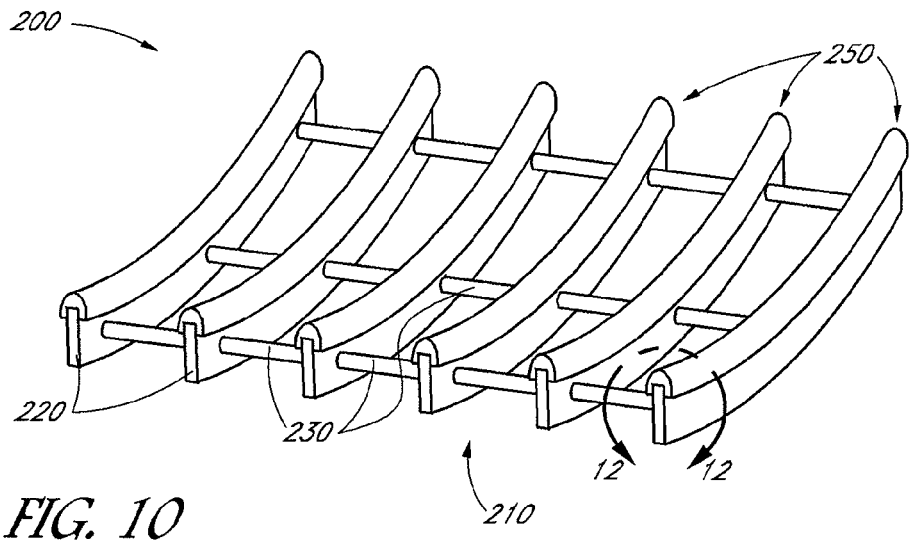
FIG. 10 is a perspective view of another embodiment of an improved sag mold.
Figure 12:
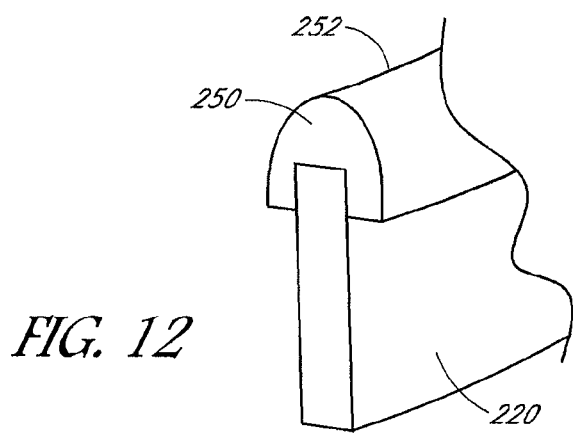
FIG. 12 is a detailed view of a portion of the embodiment of a sag mold of FIG. 10.
Figure 14:
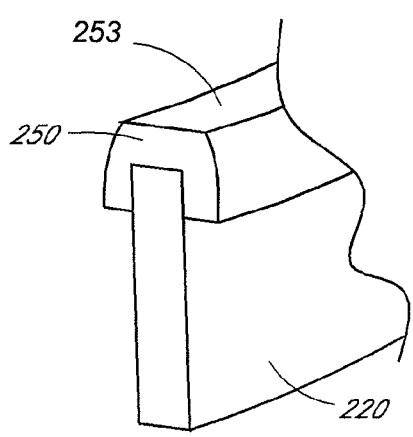
FIG. 14 is a detailed view of another embodiment of a sag mold.
Figure 13:
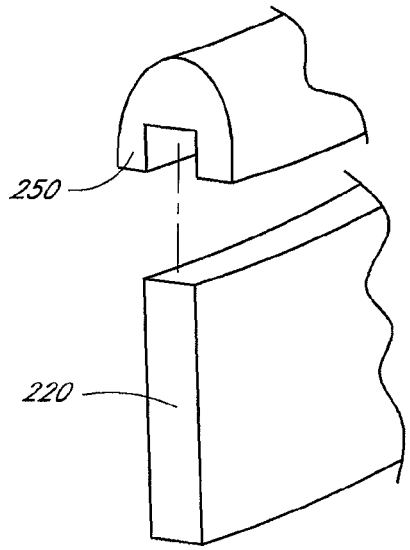
FIG. 13 is an exploded view of the detail portion of FIG. 10.
Figure 15:
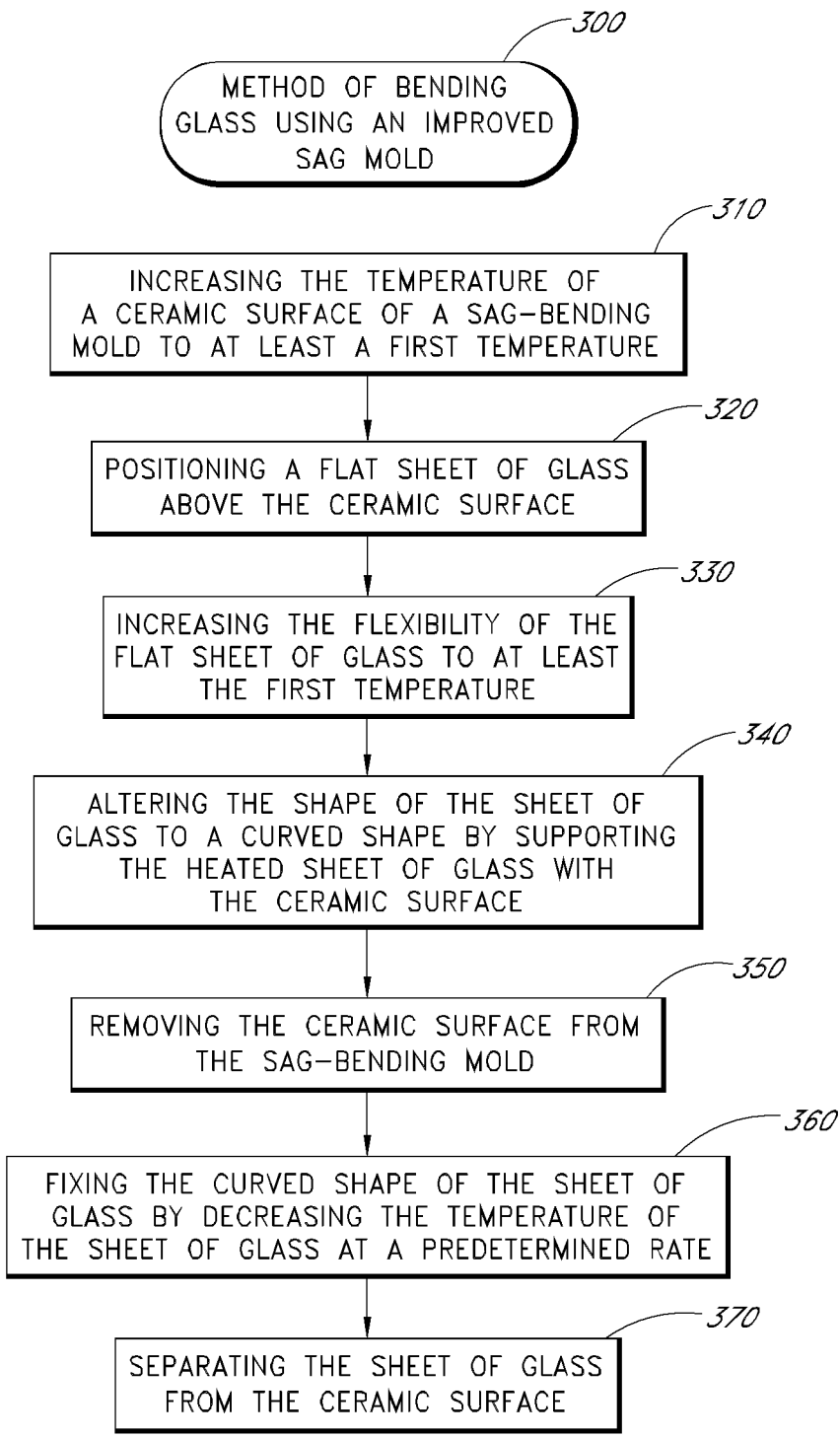
FIG. 15 is a flowchart describing a process for sag-bending glass using an improved sag mold.

Another technique for improving quality of sag-bent glass is providing a capping surface atop the longitudinal and lateral members of a rib portion. The capping surface can provide a thermally-stable surface for contacting the glass sheet, offering superior performance to the metal members which are currently used to contact glass sheets. FIG. 10 illustrates one such sag mold 200.

Although describing a different technique for improving sag-bending mold performance, it should be understood that certain components have similar features and properties to those described above with respect to sag mold 100. For example, the longitudinal and lateral members, though having described differences, have similar properties of upper surface 252 formation, whether by longitudinal member(s), lateral member(s), or a combination thereof, as well as similar properties of orientation, connectedness, etc. Unlike sag mold 100, however, certain variant features are present in sag mold 200, described in FIGS. 10-14, as described below. Thus, unless described differently, components designated by numerical indicators in FIGS. 10-14 are similar to those described above with reference to sag mold 100 and the various embodiments illustrated in FIGS. 1-9, except that the numerical indicator has been incremented by 100.

Sag mold 200 comprises a rib portion 210 and a contact surface 250. The rib portion 210 is comprised of longitudinal and lateral members 220, 230 arranged substantially perpendicularly. The contact surface 250 can be seen in FIG. 12, a detailed view of a portion of FIG. 11, wherein an end of a longitudinal member 220 is shown with the contact surface 250 above. In certain embodiments, the contact surface 250 is positioned atop the lateral members 230, while in still others, it is present on a combination, thus forming the glass-bearing upper surface of the sag mold 200.

The contact surface 250 can be constructed to have properties, characteristics, and dimensions similar to those described above with respect to support sheet 150, if desired. The contact surface 250 can be formed by depositing a material on the upper surface 232 of rib portion 210 to form a curved upper surface 252 which supports glass being sag-bent on the sag mold 200. The contact surface 250 can have a curved cross-section, as shown in the detailed view of FIG. 12 or 13, the latter being an exploded view of the former. In other embodiments, such as that shown in FIG. 14, the contact surface can have a flattened upper surface 253.

The contact surface 250 can provide improved thermal performance, similar to support sheet 150, inhibiting dissimilar thermal transfer rates between the portions of the glass sheets positioned on the sag mold 200 contacting metal rib members and those portions not contacting metal rib members. By providing a thermally stable contact interface between the glass sheet and the contact surface 250, imperfections in the bent glass sheet can be inhibited, minimized in size, or eliminated entirely.

Figure 11:
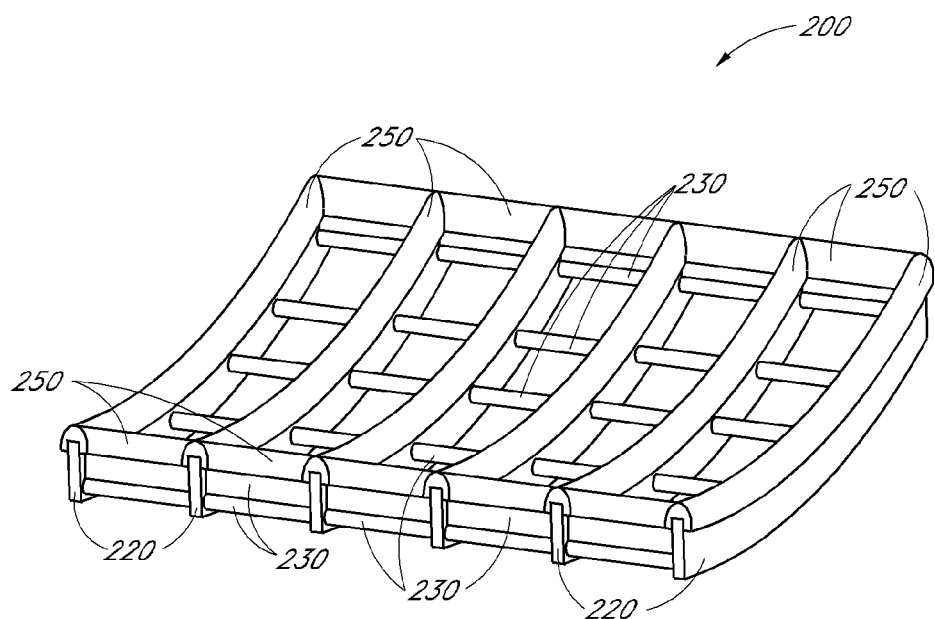
FIG. 11 is a perspective view of another embodiment of the sag mold of FIG. 10.

As with sag mold 100 in an alternative embodiment, the rib portion 210 can be bounded by a perimeter, such as one formed with two perimeter longitudinal members and two perimeter lateral members, as shown in the embodiment illustrated in FIG. 11.

For illustrative purposes, the following description of method 300 may refer to elements mentioned above in connection with FIGS. 1-14. In practice, portions of method 300 may be performed by different elements of the described system, e.g., support surface 150, contact surface 250, or sag mold 100, 200. It should be appreciated that method 300 may include any number of additional or alternative steps, the steps shown in FIG. 14 need not be performed in the illustrated order, and method 300 may be incorporated into a more comprehensive procedure or process having additional functionality not described in detail herein.

To bend a flat glass sheet to one having a desired curved surface, a sag mold having a support surface, such as a ceramic surface, can be heated to a predetermined first temperature in a heating device, such as a furnace 310. An exemplary first temperature is 400° Celcius, though any other desired temperature, greater or lesser, can be selected for the particular process, glass sheet dimensions, and other elements of the process. The glass sheet can be positioned above the ceramic upper surface 320, either in the furnace or outside. The temperature of the glass sheet can then be increased to at least the first temperature to increase the flexibility of the glass sheet 330. The shape of the glass sheet can then be adjusted by supporting it on the ceramic surface while in the state of increased flexibility caused by the raised temperature of the glass sheet 340. Thus, the ceramic surface can cause the glass sheet to take a curved shape based on the shape of the upper surface of the ceramic surface, such as a parabolic or partial parabolic shape.

In some embodiments, the ceramic surface can be decoupled from the underlying rib portion 350. In such an embodiment, the ceramic surface can be further processed separately from the rib portion. Such a separation can take place within the heating environment, such as the furnace, or in a post-processing location. In other embodiments of method 300, the ceramic surface can remain coupled to the rib portion. In either case, the curved shape of the glass sheet can be fixed by cooling it 360. As with any glass or metal, the cooling process can determine material properties of the final item. Accordingly, the glass can be cooled using a predetermined rate to produce the desired curved glass sheet for future use.

Regardless of the rate of cooling, detachment of ceramic surface, or location of processing, the curved glass sheet can eventually be separated from the ceramic surface 370.

In this way, a curved glass sheet for use in a mirror can be produced having fewer imperfections than one which is produced using a rib portion alone. Thus, the resulting CPV system incorporating the improved curved glass sheet in a mirror will exhibit superior operating characteristics.

In addition to the thermal effects described above, the reflective surface can be subject to edge effects during the post-bending cooling process. Because the edges of a sheet of heated glass cool more rapidly than the center of the sheet, they can have a curved shape that differs from the slower-cooling rest of the sheet. These shape imperfections can adversely affect the performance of the reflector and, if used in a CPV system, the power of the system.

One solution to reduce edge curvature imperfections is to position a thermal regulator, heat regulator, or thermal manager near the edges of the sheet of glass before and during the cooling process. The thermal manager can adjust the radiant and convective heat transfer processes during cooling to maintain a more uniform cooling profile within the sheet of glass. Because the glass will cool more uniformly, the edge effects are minimized or eliminated, improving the precision of the reflector formed from the sag-bent glass sheet.

Additionally, uniform cooling of the glass sheet permits more rapid cooling than would otherwise be possible. Thermal gradients within the glass sheet can cause stress-induced deformation. This in turn can adversely affect the resulting optical properties of the glass. If the glass sheet without edge thermal management were cooled at a first rate, the faster cooling of the edges would cause the glass sheet to experience a thermal gradient. As long as the first cooling rate was sufficiently small, the stress resulting from the gradient would have little impact on the mirror's optical properties once cooled. If, however, the same glass sheet were cooled at a much faster, second rate, the stress resulting from the thermal gradient would cause much larger deviations from the designed optical properties.

The use of a thermal manager or heat regulator which adjusts the cooling rate of the edges produces a more uniform temperature distribution in the glass sheet, thereby reducing the thermal gradient. As a result, the glass sheet can be cooled at the second, faster cooling rate described above without experiencing the stress-induced optical imperfections. Thus, edge heat management can not only improve the optical properties of the glass, but also improve the processing rate of each glass sheet, increasing overall throughput through a sag-bending process.

Figure 16:
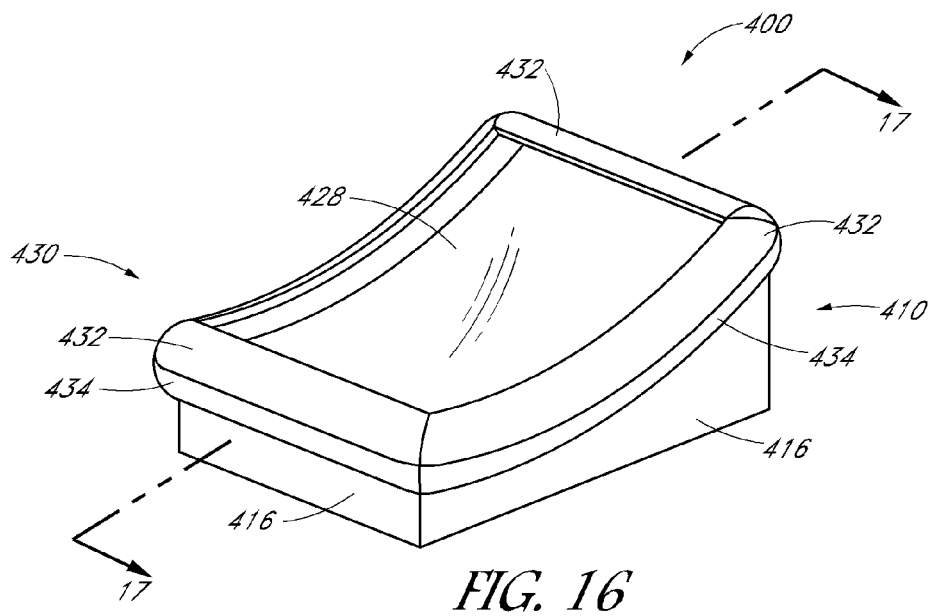
FIG. 16 is a perspective view of an embodiment of a sag-bending glass mold with a thermal manager.

FIG. 16 illustrates a sag-bending mold assembly 400. The mold assembly 400 comprises a mold 410 and a thermal regulator or manager 430. The mold 410 can be a sag-bending mold shaped and constructed to receive a sheet of glass during glass bending. The mold 410 can be of any type described above with reference to FIGS. 1-14, including or omitting features identified therein, as desired, as well as any other rib- or perimeter-constructed sag-bending mold. The mold 410 can support, be formed with, releasably couple to, or cooperate with the thermal manager 430 to position the thermal manager 430 around the glass supported on the mold 410.

Figure 17:
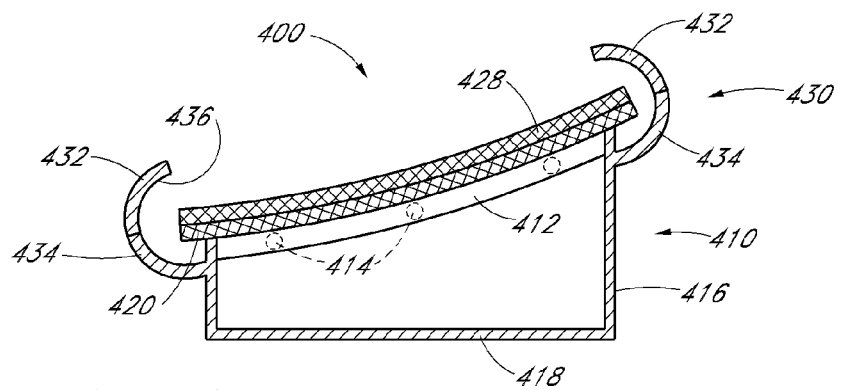
FIG. 17 is a cross-sectional side view of the sag-bending glass mold and thermal manager embodiment.

With additional reference to FIG. 17, the mold 410 can have one or more rib members 412 extending in a first direction. The rib members 412 can have support members 414 extending between rib members 412 in a traverse direction, including perpendicular, to the first direction, connecting the rib members 412. In certain embodiments, the support members 414 can be limited to perimeter members, such as the sidewalls 416. The mold 410 can additionally comprise a sidewall 416, bottom portion 418, and a support sheet 420. The rib members 412, alone together with the support member 414, can form a collective upper surface. The upper surface can receive a glass sheet 428 directly, or it can mount a support sheet 420, similar to the support sheets described above. Thus, the support sheet 420 can receive and adjust the curvature of the heated glass sheet 428.

In the illustrated embodiment, the mold 410, and correspondingly the thermal manager 430, has a quadrilateral shape, namely rectangular. Other embodiments can have different shapes, whether a regular shape, such as pentagonal, octagonal, and so on, a circular shape or variations, such as ovoid or elliptical, or even variations on the aspect ratio of the illustrated quadrilateral, as desired for the embodiment.

With continued reference to FIGS. 16 and 17, the thermal manager 430 can have a curved cross-sectional shape extending below and above the glass sheet 428 and, when present in the embodiment, the support sheet 420. The thermal manager 430 can comprises an upper portion 432 and a lower portion 434.

The thermal manager 430 can have an inner surface 436 directed toward the glass sheet 428 or mold 410. The inner surface 436 can extend along both the upper and lower portions 432, 434. The inner surface 436 can be a reflective surface, including, in some embodiments, surfaces which are reflective to infrared radiation. In certain embodiments, the inner surface 436 on either the upper or lower portion 432, 434 can be solid, while in other embodiments, it can be easily permeable to gas, such as with a perforated or ventilated section extending partway or entirely along either or both of the portions 432, 434.

In some embodiments, the glass sheet 428 can be supported by the rib members 412 and/or support members 414 beyond the edge of the sidewalls 416, as shown. In those embodiments, including the illustrated embodiment, the support sheet 420 can also extend beyond the side walls 416, matching the size and shape of the glass sheet 428. In such embodiments, the portion of either or both of the glass sheet 428 and support sheet 420 can be considered the periphery of the mold 410 or glass sheet 428 itself. The periphery can, in some embodiments, extend inward toward from the edges any reasonable amount so as not to be considered the center of either the mold 410 or glass sheet 428. Thus, while the thermal manager 430 is shown with an upper portion 432 extending over the periphery of the glass sheet 428 in some illustrated embodiments, in other embodiments, it can extend further inward of the glass sheet 428 beyond the edge marked by the sidewalls 416.

Additionally, in any of the embodiments where the support sheet 420 and/or glass sheet 428 terminate at or do not extend beyond the side walls 416, the periphery of the mold 410, including the rib members 412, and glass sheet 428 can extend inward from the side walls 416. Thus, the upper portion 432 can extend as far inward of the glass sheet 428 as desired for the embodiment. Similarly, the lower portion 434 can extend under the periphery as far as desired, including the formation with the sidewall 416. In those embodiments where the lower portion 434 extends inward of the sidewall 416, or the sidewall is omitted 416, the lower portion 434 can extend inward as far as desired. Thus, in some embodiments, the upper and lower portions 432, 434 of the thermal manager 430 can extend above and below the periphery of the rib members 412, support members 414, mold 410, support sheet 420, and/or glass sheet 428. In certain embodiments, the thermal manager 430, including the upper portion 432, can curve toward the glass sheet. Thus, in some embodiments, for example, the thermal manager 430 can curve downward toward the glass sheet.

Although the illustrated embodiments depict a complete perimeter around the glass sheet 428, in certain embodiments, the thermal manager 430 can extend only partway along the perimeter of the glass sheet 428. For example, it could be present only along two opposite sides, whether lateral or top and bottom. In some embodiments, it can be discontinuous, having openings along the periphery.

The thermal manager 430 is illustrated as having a curved inner surface 436, and spaced apart a distance from any surface or edge of the glass sheet 428. This distance can vary between embodiments, with no portion of the curved inner surface 436 closer to the glass sheet 428 than 1 millimeter, or, in other embodiments, no portion of the inner surface 436 farther from the glass sheet 428 than 200 millimeters. Other embodiments can have geometries representing the entire range between. In some embodiments, the inner surface 436 is a constant distance from the glass sheet 428, while in others, such as the illustrated embodiments, the distance can vary, based on the curvature of the inner surface 436.

The actual shape of the upper and lower portions 432, 434 can vary between embodiments. Thus, some embodiments of the thermal manager 430 can be shaped and positioned to extend the inner surface 436 very close to the glass sheet 428 and/or support sheet 420, with little clearance therebetween. In other embodiments, the thermal manager 430 can be constructed and positioned to permit a sizable air gap between the inner surface 436 and the glass sheet.

In the illustrated embodiment, one sidewall 416 has a greater height upwards from the bottom portion 418 than the other. The side with greater height is referred to as the upper side. The connection between the lower portion 434 and sidewall 416 is higher on the upper side than the lower side. Because the connection is a constant distance below the support sheet 420 or glass sheet 428, the cross-sectional shape of the thermal manager 430 can remain constant. If, however, the connection between sidewall 416 and lower portion 434 were an equal height from the bottom portion 418 on both the upper and lower sides, the shape of the thermal manager 430 on the upper side would extend a greater vertical distance upward to cover the glass sheet 428 from above with the upper portion 432. Thus, the cross-sectional shape of the thermal manager 430 need not remain identical on each side of a single embodiment.

With particular reference to the variability between different embodiments, the thermal manager 430 can have any of a number cross-sectional shapes, including the substantially circular curvature depicted, as well as other curved shapes, or rectilinear shapes, such as three sides of a square or other quadrilateral surrounding the top, outer side, and bottom of the glass sheet 428, rib member 412, or support sheet 420, or any combination thereof. Additionally, the shapes need not be symmetric between the upper and lower portions 432, 434. Thus, in some embodiments, the lower portion 434 can extend further under the glass sheet 428, rib members 412, and/or support sheet 420 than the upper portion 432 extends over the same. In other embodiments, the opposite can be true, if desired.

Similarly, although FIGS. 16 and 17 depict an embodiment of the thermal manager 430 integrally formed with the sidewall 416, certain embodiments can have gaps beneath, permitting air to exchange from within the cavity between the glass sheet 428 and inner surface 436 into the ambient environment.

The thermal manager 430 can be constructed as a single solid component, such as a curved portion or metal. In other embodiments, it can be several joined components, including curved sheets of metal. The thickness, as with all components depicted in the figures, is not to any scale and shown for illustrative purposes only. Thus, the thickness of the thermal manager 430 can be substantially less than the thickness of the glass sheet 428, or greater in some embodiments.

The inner surface 436 can be formed from a separate material, such as a highly reflective, including thermally-reflective, material. Thus, the inner surface 436 can be a coating, paint, plated material, or any desired formation of material.

Figure 18:
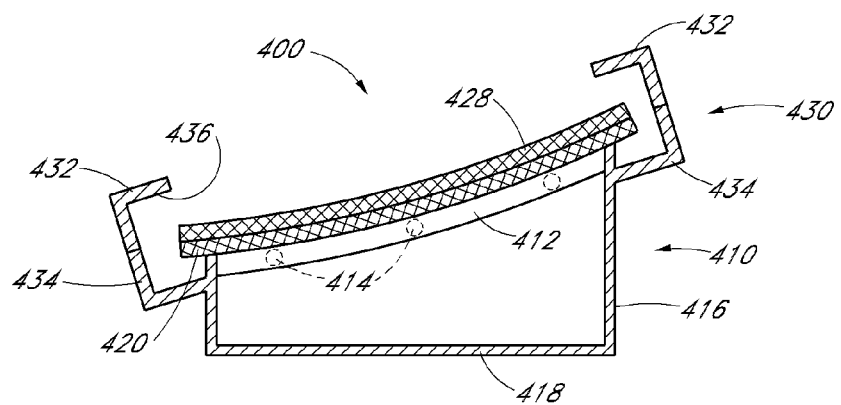
FIG. 18 is a cross-sectional side view of another embodiment of a sag-bending glass mold and thermal manager.

FIG. 18 illustrates an alternative embodiment of the mold assembly 400, wherein the thermal manager 430 has a rectilinear cross-sectional shape. The length of any one of the sections of the thermal manager 430 can be adjusted as desired to change the distance of the inner surface 436 from the glass sheet 428.

Figure 19:
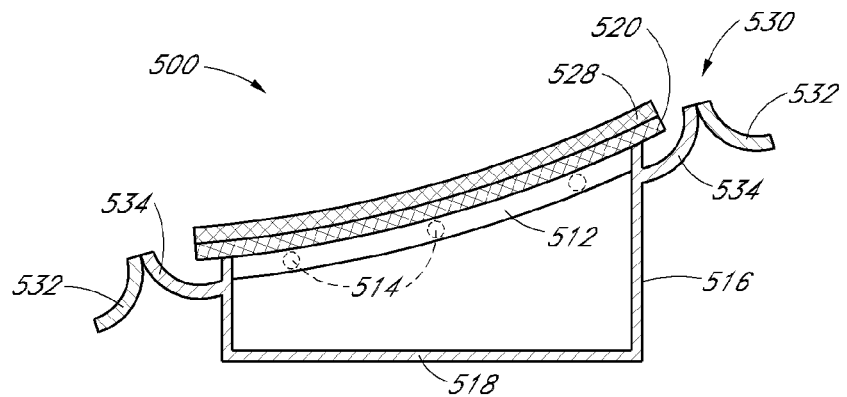
FIG. 19 is a cross-sectional side view of another embodiment of a thermal manager.

With reference to FIG. 19, in certain embodiments, the upper and lower portions 532, 534 can be constructed to be unitary, rigid components. Unless otherwise specified, the numeric indicators used herein refer to components similar to those identified above with respect to FIGS. 16-18, except that the number has been incremented by 100. In some embodiments of the thermal manager 530, the portions 532, 534 can be articulable or pivotable relative to one other. In such embodiments, the thermal manager 530 can be positioned in at least two positions: an engaged and a disengaged position. In the first, engaged position, the upper portion 532 can be positioned above and extending over the glass sheet 528, as depicted in FIGS. 16-18. In the second, disengaged, open, or separated position, the upper portion 532 can be rotated or pivoted to an open state, wherein the glass sheet 528 is uncovered when considered from above. A hinge or pivot connection can be used to connect the upper portion 532 with the lower portion 534. The upper portion 532 need not be a single integral piece, but open or releasable along the seamed corners illustrated to permit the upper portion 534 to rotate open in each of the four directions corresponding to the quadrilateral edges.

In some embodiments, the lower portion 534 can be separate from the mold 510. In certain embodiments, the lower portion 534 can be coupled to the mold 510, such as with fasteners, coupling devices, an interference fit, a latch, buckle, tab-in-slot connection, or any other desired technique. Similarly, although the upper portion 532 is illustrated as being pivotally or hingedly connected to the lower portion 534, in some embodiments, other techniques can be used to couple, including releasably or detachedly couple, the portions 532, 534. Thus, in a first position, the lower portion 534 can be coupled to the mold 510, while in a second position, it can be released from the coupled position.

Figure 20:
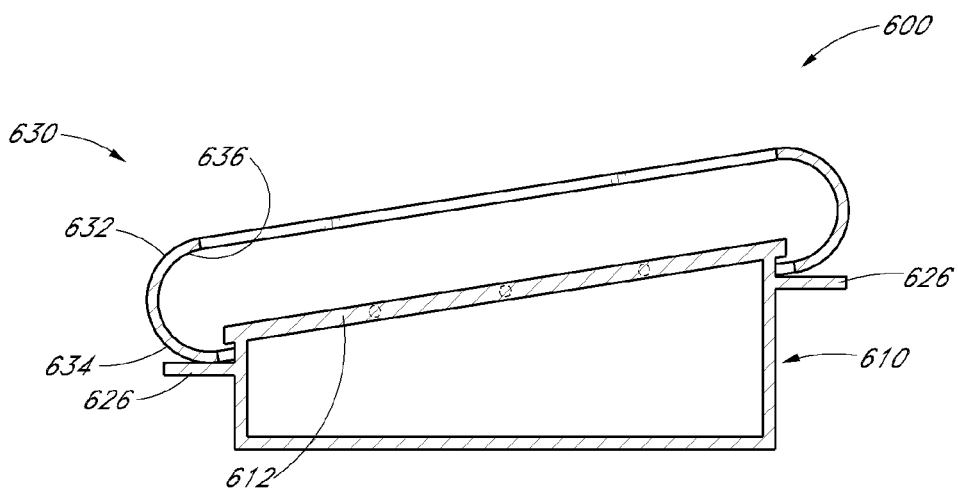
FIG. 20 is a cross-sectional side view of another embodiment of a sag-bending glass mold and thermal manager.

With reference to FIG. 20, another embodiment of a mold assembly 600 is shown. Unless otherwise specified, the numeric indicators used herein refer to components similar to those identified above with respect to FIGS. 16-18, and FIG. 19, except that the number has been incremented by 200 and 100, respectively.

In the embodiment illustrated in FIG. 20, the thermal manager 630 is a discrete unit, separate from the mold 610. Although, in some embodiments, the thermal manager 630 can be coupled, including releasably coupled, to the mold 610. The mold 610 can be constructed with protruding flange portions 626 which extend partially or entirely around the outer edge of the sidewalls 616. The flange portions 626 can be formed only along portions of the sidewalls 616 where the lower portion 634 will rest on the flange portion 626 when engaged. Thus, if the thermal manager 630 extended along only two opposite edges of the mold 610, the mold 610 can be constructed with only flange portions 626 extending along those opposite edges.

Figure 21:
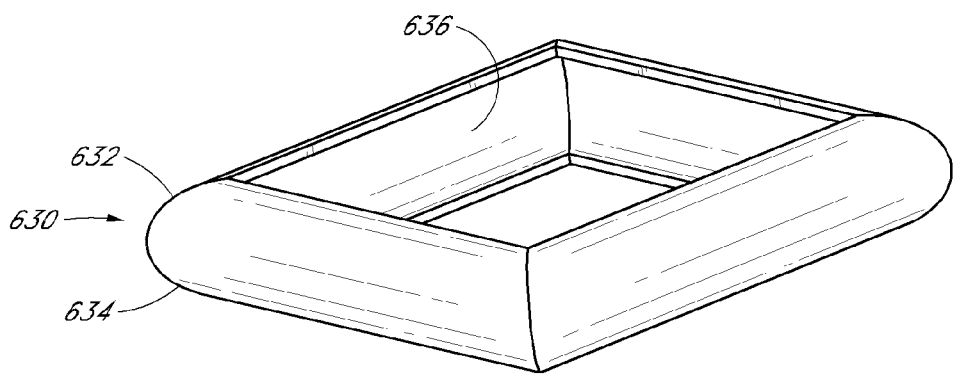
FIG. 21 is a perspective view of the embodiment of the sag-bending glass mold of FIG. 19.

With additional reference to FIG. 21, the thermal manager 630 can be a single piece. As described above, however, certain embodiments can have multiple segments, such as a separate upper and lower portion 632, 634, permitting the release or coupling, as desired, of the respective portions.

In the illustrated mold assembly 600, it should be appreciated that the lower portion 634 can be shaped and constructed such that when the thermal manager 630 is lifted upwards past the rib members 612 and glass sheet (not shown), there is sufficient clearance between the lower portion 634 and other components so as not to disturb the glass sheet. In this way, the thermal manager 630 can be placed on the flange portions 626 from above the mold 610, and removed in the same manner.

Figure 22:
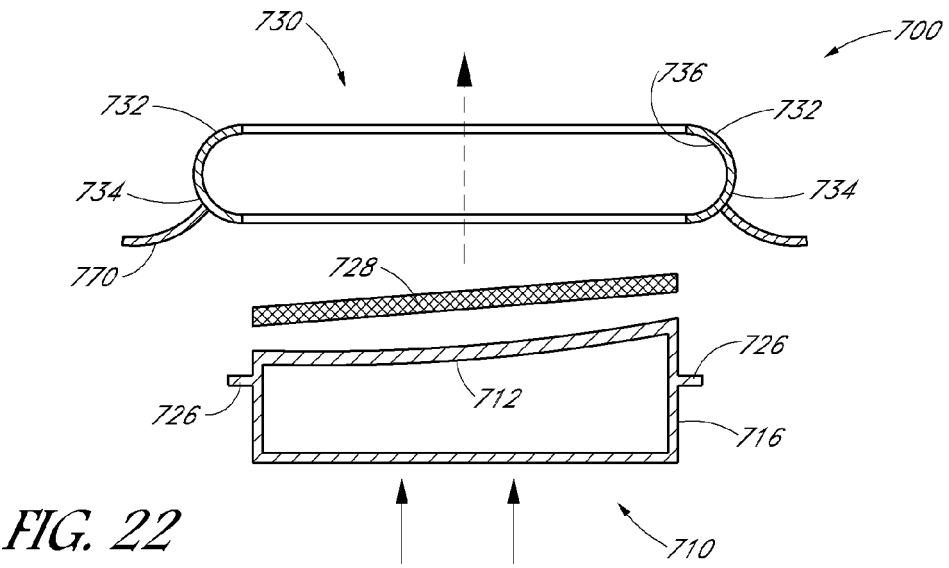
FIGS. 22-24 are cross-sectional side views of a sag-bending glass mold assembly with a thermal manager in several states of processing.

FIG. 22 illustrates a technique for using an embodiment similar to that illustrated in FIGS. 20 and 21 in a heated environment, such as a furnace or oven. Unless otherwise specified, the numeric indicators used herein refer to components similar to those identified above with respect to FIGS. 16-18, 19, and, 20 and 21, except that the number has been incremented by 300, 200, and 100, respectively.

Figure 23:
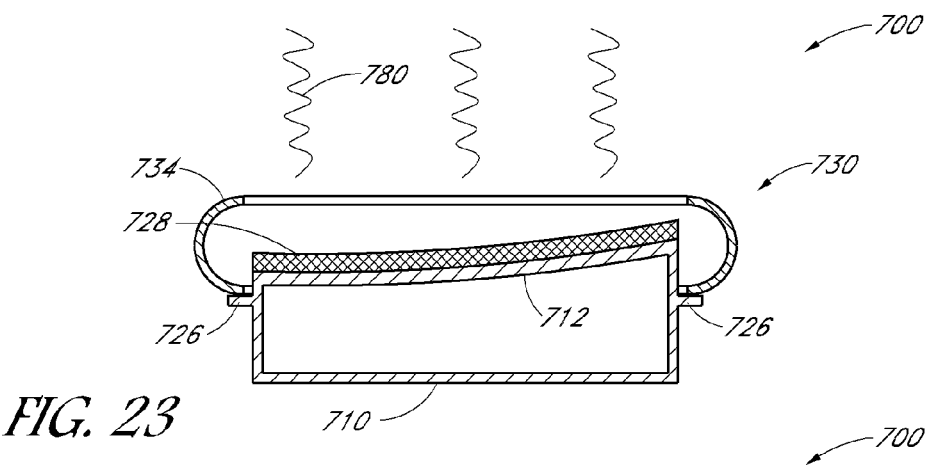
Figure 24:
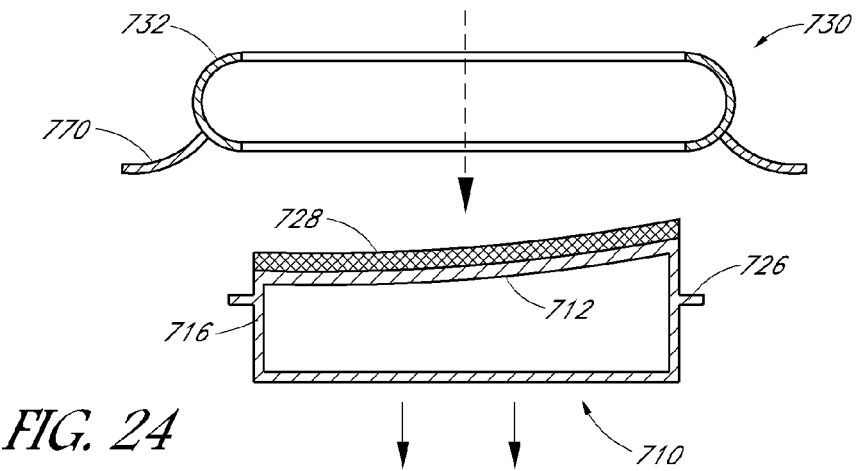

FIGS. 22-24 illustrates a mold assembly 700 in three stages of processing, in which a glass sheet 728 begins as a flat, rigid sheet and is sag bent with the benefit of regulation of edge effects by the thermal manager 730.

With reference to FIG. 22, a mold 710 is shown positioned beneath a thermal manager 730. The thermal manager 730 is supported by its lower portion 734 on a platform 770. The platform 770 can be stationary or mobile, such as part of a transport system. The glass sheet 728 can be positioned on the rib members 712 or, depending on the embodiment, a support sheet (not shown).

The mold 710 can then move upwards relative to the thermal manager 730, causing the lower portion 734 to contact the flange portions 726, resting the thermal manager 730 on the mold 710. In certain embodiments, the transport system can move the mold 710 up toward the thermal manager 730 while in others, the manager 730 can be moved downward onto the mold 710. In some embodiments, the manager 730 can be positioned on the mold 710 within an oven, such as in a first thermal section of an oven at a first temperature. Unlike the embodiment of FIGS. 20 and 21, the flange portions 726 are the same height on the sidewalls 716, resulting in a thermal manager which extends to dissimilar heights on the upper and lower sides of the mold 710. In other embodiments, a thermal manager and mold arrangement incorporating features similar to those described in other embodiments can also be used.

With reference to FIG. 23, the mold assembly 700 can be positioned in a second thermal section of the oven. In various embodiments, the second thermal section can be above, below, or beside the first thermal section. The first and second thermal sections can have different or similar temperatures. In the illustrated embodiment, the second thermal section can have a relatively higher temperature, sufficient to sag-bend the glass sheet 728. The heat 780 can be introduced with the thermal manager 730 coupled with, connected to, or positioned on the mold 710, as shown. In certain embodiments, the heat 780 sufficient to sag-bend the glass sheet 728 can be introduced prior to positioning the thermal manager 730. That is, in some embodiments, the mold 710 can be heated, and the glass sheet 728 sag-bent prior to positioning of the thermal manager 730 around the periphery of the glass sheet 728.

The mold assembly 700 can be maintained at the second temperature for any desired length of time to accomplish the sag-bending of the glass sheet 728. In certain embodiments, the mold assembly 700 can be traveling through the oven during this phase of processing. The transport system can be used to accomplish this movement as well.

With reference to FIG. 24, the mold assembly 710 can be removed from the second thermal section of the oven and back to the first thermal section, or to a third thermal section to cool. The thermal manager 730 can remain in position around the periphery of the glass sheet 728 for any desired length of time. Such a time period can correspond to the time necessary for the glass sheet 728 to uniformly cool to the ambient temperature. In some embodiments, the thermal manager 730 can be separated from the mold 710 prior to complete cooling of the glass sheet 728 ambient temperature.

In either case, the mitigation of edge effects can be accomplished, resulting in a sag-bent curved glass sheet 728 which has little or no curvature mismatch with the remainder of the glass sheet 728, including its center.

The mold 710 can be moved downward relative to the thermal manager 730 past the same or a different platform 770. The platform 770 can contact the lower portion 734 of the thermal manager 730 and support it, causing it to separate from the mold 710 as the mold 710 continues its relative downward motion. In certain embodiments, the mold 710 can remain stationary while the platform 770 is moved relative to the mold 710 to lift the thermal manager 730 off the mold 710.

The above process for using a platform 770 to position and remove the thermal manager 730 illustrates just one technique for positioning the thermal manager as part of a sag-bending process. As an exemplary alternative embodiment, the thermal manager can remain integrally formed with the mold, with a hinged or pivoting upper portion. Thus, a flat glass sheet can be positioned on a mold. The mold with the glass sheet can then be heated and cooled. The upper portion of the thermal manager can be positioned above and around periphery of the glass sheet either before or during the heating. In certain embodiments of the mold assembly, the mold can be positioned after the heating is complete and after cooling has begun.

With continued reference to the exemplary alternative embodiment described above, the transport system can move the mold in such a way as to contact a stationary object which can rotate or pivot the upper portion into the engaged, covering position. A similar stationary object can be used to position the upper portion of a thermal manager into an open position after cooling, permitting removal of the sag-bent glass sheet.

In some embodiments, the transport system can releasably couple to the thermal manager, or just the upper portion of the thermal manager, and position it directly on the mold at any desired step in the sequence. In some embodiments, the transport system can move the mold assembly about entirely within the oven. In other embodiments, the transport system can move the mold assembly into and/or out of the oven.

The use of a thermal manager surrounding a sag-bent glass sheet can mitigate the edge effects present in ambient-cooled glass sheets. By mitigating these effects, curvature of the glass sheet can be more uniform as compared to a glass sheet sag-bent without the presence of the thermal manager. The IR-reflective coating on the inside of the thermal manager can help maintain a higher temperature in the edges than would be present without the thermal manager. By causing the edges to cool at a slower rate—a rate that more closely matches the cooling rate of the center of the glass sheet—the more uniform cooling rate helps maintain uniform curvature. Additionally, by forming air pockets in the cavity of the thermal manager, warm air can be trapped, or cool air permitted to vent, the convective component of cooling can also be managed, again increasing the uniform cooling of the glass sheet. As a result of the uniform cooling, the rate of cooling can be increased without affecting the optical properties of the glass sheet, thereby reducing processing time, and increasing throughput of the glass bending process.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A sag-bending system, comprising:
a sag-bending glass support mold having a quadrilateral shape, a collective upper surface, and a periphery, the support mold comprising:
a plurality of rib members extending in a first direction, each of the plurality of rib members having a curved upper surface shaped to form the collective upper surface having a position and shape to support a quadrilateral-shaped sag-bent glass sheet into a desired contour, each of the rib members further having a lower surface;
a plurality of support members extending in a second direction between at least two of the plurality of rib members, the second direction traverse to the first direction; and
wherein the periphery of the support mold is formed by the edges of the rib members; and
a perimeter thermal manager sized and positioned to surround, to extend at least partially over, and to extend at least partially under the periphery of the support mold, the thermal manager comprising:
an upper portion sized and positioned to extend over the periphery portion of the collective upper surface, the upper portion extending over the upper surface of at least one rib member; and
a lower portion sized and positioned to extend under the periphery portion of the support mold, the lower portion extending under the lower surface of the at least one rib member.

2. The sag-bending system of claim 1, wherein the upper and lower portions of the perimeter thermal manager are integrally formed as a single unit.

3. The sag-bending system of claim 1, wherein the thermal manager has an inner surface directed toward the support mold, the inner surface having an infrared-reflective surface.

4. The sag-bending system of claim 1, wherein the lower portion extends under the lower surface of the at least one rib member further than the upper portion extends over the upper surface.

5. The sag-bending system of claim 1, wherein the lower portion is curved upward toward the lower surface of the at least one rib member.

6. The sag-bending system of claim 1, wherein the lower portion of the thermal manager comprises a perforated section.

7. The sag-bending system of claim 1, wherein the thermal manager is releasably coupled to the support mold.

8. The sag-bending system of claim 7, wherein the lower and upper portions of the thermal manager are pivotable relative to each other to permit the thermal manager to be separated from the support mold in a first position and to engage in a second position to surround the periphery of the support mold and inhibit separation of the thermal manager from the support mold.

9. The sag-bending system of claim 7, wherein the upper and lower portions of the thermal manager are connected by a hinge.

10. A sag-bending system for rigid glass sheets, the system comprising:
an oven adapted to confine heat in an enclosed space;
a sag-bending mold adapted to receive a heated glass sheet, the sag-bending mold having a top surface, a bottom surface, and a perimeter, and sized to be positioned within the oven;
a transport system adapted to move the sag-bending mold into and out of the oven; and
a perimeter heat regulator sized and positionable in a first position to surround and to at least partially enclose the sag-bending mold, wherein the perimeter heat regulator extends around substantially the entire perimeter of the sag-bending mold, covers at least part of the top surface, and extends under at least part of the bottom surface,
wherein the heat regulator is releasably coupled to the sag-bending mold.

11. The system of claim 10, wherein the heat regulator is further positionable in a second position, wherein the heat regulator does not extend around substantially the entire perimeter of the sag-bending mold, cover at least part of the top surface, or extend under at least part of the bottom surface.

12. The system of claim 11, wherein the heat regulator comprises at least one pivotable coupling, and pivots about the pivotable coupling between the first and second positions.

13. The system of claim 12, wherein the transport system is further adapted to adjust the position of the heat regulator between the first and second positions.

14. The system of claim 13, wherein the oven has a first section and a second section and transport system is further adapted to position the heat regulator in the first position in the first section and to position the heat regulator in the second position in the second section.

15. A sag-bending system comprising:
sag-bending mold means for supporting a heated sheet of glass in a desired curved shape; and
a thermal regulating means for conserving heat near the edges of the mold means when a heated sheet of glass is positioned on the mold means.

16. The sag-bending system of claim 15, wherein the thermal regulating means is releasably coupled to the mold means.

17. The sag-bending system of claim 15, wherein the thermal regulating means comprises an infrared reflective surface directed toward the mold means.

18. The sag-bending system of claim 15, wherein the thermal regulating means comprises a perforated portion.

19. The sag-bending system of claim 15, wherein the thermal regulating means is adjustable between a first position near the edges of the mold means and a second position apart from the mold means.

* * * * *